(12) United States Patent
Novak et al.

(10) Patent No.: US 6,397,820 B1
(45) Date of Patent: Jun. 4, 2002

(54) METHOD AND DEVICE FOR CONTROLLING A COMBUSTION ENGINE

(75) Inventors: Peter Novak, Öckerö; Sören Eriksson, Kungälv, both of (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/509,099
(22) PCT Filed: Sep. 16, 1998
(86) PCT No.: PCT/SE98/01653
§ 371 (c)(1),
(2), (4) Date: Jun. 1, 2000
(87) PCT Pub. No.: WO99/18342
PCT Pub. Date: Apr. 15, 1999

(30) Foreign Application Priority Data

Sep. 22, 1997 (SE) ................................................ 9703394

(51) Int. Cl.[7] ............................................. F02D 41/14
(52) U.S. Cl. .................... 123/480; 60/274; 701/103; 701/108; 123/676; 123/568.16
(58) Field of Search ................. 123/480, 479, 123/586.16, 586.17, 676, 679, 689; 60/606, 274, 289; 701/103, 107, 108

(56) References Cited

U.S. PATENT DOCUMENTS

| | | | |
|---|---|---|---|
| 4,048,964 A | * 9/1977 | Kissel | 123/482 |
| 4,616,481 A | * 10/1986 | Melchior et al. | 60/606 |
| 4,711,200 A | 12/1987 | Kinoshita | 123/492 |
| 5,072,711 A | * 12/1991 | Katayama et al. | 123/486 |
| 5,094,192 A | * 3/1992 | Seiffert et al. | 123/41.15 |
| 5,103,791 A | 4/1992 | Tomisawa | 123/489 |
| 5,158,063 A | 10/1992 | Hosoda et al. | 123/676 |
| 5,303,168 A | 4/1994 | Cullen et al. | 364/557 |
| 5,319,963 A | 6/1994 | Benford | 73/118.1 |
| 5,425,233 A | * 6/1995 | Ma et al. | 60/274 |

* cited by examiner

Primary Examiner—John Kwon
Assistant Examiner—Hieu T. Vo
(74) Attorney, Agent, or Firm—Lerner, David, Littenberg, Krumholz & Mentlik, LLP (57) ABSTRACT

Methods are disclosed for controlling an internal combustion engine in a vehicle which include detecting the value of a variable associated with an operating condition of the engine including the rotational speed and the load of the engine, determining a temperature value of a temperature-critical component associated with the engine, and controlling the thermal load of the engine based upon the predetermined temperature value by adding surplus fuel to the engine in a manner which gradually increases the supply of the surplus fuel based upon the value of the predetermined variable derived from the inherent thermal inertia in the temperature-critical component. Apparatus for controlling the engine in the vehicle is also disclosed.

12 Claims, 6 Drawing Sheets

METHOD AND DEVICE FOR CONTROLLING A COMBUSTION ENGINE

FIELD OF THE INVENTION

The present invention relates to a method for controlling an internal combustion engine. In particular, the present invention is intended for use in connection with motor vehicles, for derivation of temperature values to be used in controlling the vehicle engine. The present invention also relates to apparatus for such control of an internal combustion engine.

BACKGROUND OF THE INVENTION

In connection with vehicles powered by an internal combustion engine, there is a general desire to reduce the vehicle fuel consumption as much as possible. This, in turn, is based upon environmental demands which are aimed at reducing the amount of detrimental discharges to the atmosphere, and upon demands for good fuel economy of the vehicle.

In today's motor vehicles, the supply of air and fuel to the engine is normally controlled by means of a computer-based engine control unit. This control unit is, in a known manner, arranged for detecting signals representing a number of different operating variables of the vehicle, e.g. engine speed, load, engine coolant temperature, vehicle speed, etc. From these signals, the amount of fuel to be supplied to the engine is continuously determined, and the supply is then effected by means of an injection device.

With the intention of limiting the fuel consumption of a vehicle, the control unit may be arranged, in a known way, so as to ensure that, during operation, a stoichiometric air/fuel mixture (i.e. a mixture where $\lambda=1$) is fed to the engine. This guideline value cannot be achieved, however, for all points of operation, due to limitations regarding the maximum allowed thermal load on the components comprising the engine and the exhaust system. For example, the temperature of the engine cylinder head and exhaust system, and in any existing turbocharger unit, must be held within certain predetermined maximum limits. Should these limits be exceeded, there would be a risk of damaging the components.

The risk of a high thermal load on the engine system and its components is particularly marked at high loads and engine rotational speeds. For such operating conditions, the engine exhaust gas temperature must be limited, so as not to become so high that there will be a risk of damage to the engine and its associated components, as discussed above.

According to the known art, this cooling effect is obtained by supplying a certain excess amount of fuel to the engine during the above-mentioned operating conditions, such as when the vehicle driver applies full throttle. This will require that the fuel mixture will be controlled so as to deviate from the stoichiometric mixture. More precisely, this increase in fuel supply is controlled to reach a certain level, corresponding to the exhaust gas temperature remaining lower than a predetermined limit value. The magnitude of this limit value may be based on empirical criteria, which in turn would be determined by engine tests, and would include a limit above which there is a risk of damage to certain sensitive components in the engine and exhaust system.

A major drawback with this known procedure relates to the fact that it is not always necessary to supply the excess fuel as quickly as the change in engine load, since the engine and exhaust system temperatures do not increase as quickly as the load changes. This may be attributed to thermal inertia in the various parts of the engine system. This often entails supplying an excess amount of fuel to the engine at high loads and engine speeds, which is a drawback since it increases the vehicle fuel consumption.

Within the relevant technical area, a system for controlling the fuel supply to a combustion engine of a vehicle is previously known from U.S. Pat. No. 5,103,791. This system comprises means for detection of the engine load and the engine coolant temperature. Based on these values of load and temperature, a value of the temperature in the engine exhaust system is estimated. This temperature value is the basis for a correction of the amount of fuel fed to the engine. In this way, the exhaust system temperature can be limited, reducing the risk of damage.

Another system for controlling the fuel supply to a combustion engine is described in U.S. Pat. No. 5,158,063. This system comprises means for estimating the temperature of at least one component in the engine system as a function of the current engine operating conditions. The air/fuel mixture supplied to the engine may then be controlled as a function of this estimated component temperature.

A common feature of these two known systems is that they include relatively simple models for the engine system temperature, in particular providing a control that does not account for the thermal inertia of the respective temperature-sensitive component, e.g. during a sudden increase of the load.

Consequently, there is a demand for controlling the engine operation in a more effective manner based upon derived temperature values corresponding to critical material points, so that the engine system is cooled only when this is actually needed.

The object of the present invention is therefore to provide an improved method for controlling an internal combustion engine, in particular for a more optimized control of the thermal load acting upon the engine.

SUMMARY OF THE INVENTION

This and other objects have now been realized by the invention of a method for controlling an internal combustion engine in a vehicle comprising detecting the value of at least one predetermined variable associated with an operating condition of the internal combustion engine comprising the rotational speed and the load of the internal combustion engine, determining a temperature value of at least one temperature-critical component associated with the internal combustion engine in the vehicle, the temperature-critical component having an inherent thermal inertia, and controlling the thermal load of the internal combustion engine based upon the predetermined temperature value by adding surplus fuel to the internal combustion engine, the adding of the surplus fuel to the internal combustion engine comprising gradually increasing the supply of the surplus fuel based upon the value of the at least one predetermined variable derived from the inherent thermal inertia. In a preferred embodiment, the method includes providing a predetermined limit value for the at least one temperature-critical component, and wherein the controlling of the thermal load of the internal combustion engine comprises cooling the internal combustion engine, the cooling of the internal combustion engine comprising minimizing the cooling over time without the determined temperature value exceeding the predetermined limit temperature value for the at least one temperature-critical component.

In accordance with another embodiment of the method of the present invention, the method includes providing a predetermined limit value for the at least one temperature-critical component, and wherein the gradually increasing of the supply of the surplus fuel comprises controlling the supply of the surplus fuel whereby a substantially stoichiometric air/fuel mixture of the surplus fuel is supplied to the internal combustion engine, and including gradually enriching the air/fuel mixture based upon the difference between the determined temperature value and the predetermined limit temperature value.

In accordance with a preferred embodiment of the method of the present invention, controlling of the thermal load of the internal combustion engine comprises cooling at least one cylinder of the internal combustion engine by supplying an amount of a coolant to the at least one cylinder based on at least the determined temperature value.

In accordance with another embodiment of the method of the present invention, the internal combustion engine includes a thermostat for controlling the supply of coolant to the internal combustion engine, and the controlling of the thermal load of the internal combustion engine comprises controlling the thermostat.

In accordance with another embodiment of the method of the present invention, the internal combustion engine includes a turbocharger having a wastegate valve, and wherein the controlling of the thermal load of the internal combustion engine comprises controlling the wastegate valve whereby a charge pressure for the turbocharger is generated based upon the determined temperature value.

In accordance with another embodiment of the method of the present invention, the determining of the temperature value comprises providing a dynamic model of the detected value of the at least one predetermined variable associated with the operating condition of the internal combustion engine based on the inherent thermal inertia.

In accordance with another embodiment of the method of the present invention, the at least one predetermined variable includes the injection time, the ignition angle, the cooling temperature, the temperature of air flowing into the internal combustion engine, the rotational speed, the air flow rate and the speed of the vehicle.

In accordance with another embodiment of the method of the present invention, the determining of the temperature value of the at least one temperature-critical component comprises determining at least two temperature values of at least two temperature-critical components, and including controlling the thermal load of the internal combustion engine based upon the determined temperature value representing the largest reduction of the thermal load. Preferably, the internal combustion engine includes at least one cylinder head and a turbocharger, and the at least two temperature-critical components comprise the at least one cylinder head and the turbocharger.

In accordance with another embodiment of the method of the present invention, the method includes adapting the value of the at least one predetermined variable associated with the operating conditions of the internal combustion engine based upon changes in the detected values.

In accordance with the present invention, apparatus have been provided for controlling an internal combustion engine in a vehicle comprising at least one sensor for detecting the value of at least one predetermined variable associated with an operating condition of the internal combustion engine comprising the rotational speed and the load of the internal combustion engine, and a control unit for controlling an air/fuel mixture supplied to the internal combustion engine, determining a temperature value of at least one temperature-critical component associated with the internal combustion engine in the vehicle, the temperature-critical component having an inherent thermal inertia, and controlling the thermal load of the internal combustion engine based upon the determined temperature value by adding surplus fuel to the internal combustion engine and gradually increasing the supply of the surplus fuel based upon the value of the at least one predetermined variable derived from the inherent thermal inertia.

The method according to the present invention comprises detection of data representing predetermined variables of the operating condition of the engine and the vehicle, detection of a condition which corresponds to the fact that a particular thermal load upon the engine is present, determining at least one temperature value of the material of at least one component which is arranged with respect to the engine, and controlling the thermal load of the engine dependent upon at least said temperature value. The present invention is characterized in that the control of the thermal load of the engine is carried out dependent upon the thermal inertia inherent in the component in connection with changes in the rotational speed and/or load of the engine.

In accordance with the present invention, the engine can be cooled in an-optimum way during e.g. sudden increases in load and speed. This, in turn, will ensure that certain predetermined critical material temperature values are never exceeded, This cooling, i.e. the limitation of the thermal load on the engine system, may be achieved by utilizing derived temperature values corresponding to temperature-critical components for control of the air/fuel mixture supplied to the engine, whereby an additional amount of fuel is supplied as a function of the temperature values. In this manner particularly the enrichment of the air/fuel mixture can be delayed until its cooling effect is really needed. This leads to a lower fuel consumption.

The derivation according to the present invention is active within a certain "critical area" of engine operation, which is characterized by high loads and high speeds. Within this "critical area" there is a risk that some engine component might experience a temperature exceeding a critical value, thereby risking damage to that component. This "critical area" is defined in this description as that area where the engine is normally controlled with an air/fuel mixture deviating from the stoichiometric relationship.

According to a first embodiment of the present invention the cooling, i.e. the limitation of the thermal load on the engine system, can be achieved by using the derived temperature values for controlling the air/fuel mixture supplied to the engine, whereby an additional amount of fuel is supplied as a function of the derived temperature values. In this manner, particularly enrichment of the air/fuel mixture, can be delayed until its cooling effect is really needed. This leads to a decreased fuel consumption.

According to a second embodiment of the present invention, the thermal load on the engine system may be limited by injecting water or a corresponding coolant directly into one or more of the engine cylinders. This will provide environmental advantages and will also provide a quick cooling response in the engine cylinders.

According to a third embodiment of the present invention, the thermal load on the engine system may be limited by control of a thermostat forming part of the engine cooling system.

According to a fourth embodiment of the present invention, which is particularly suitable for engines provided with a turbocharger unit the thermal load may be limited by controlling the charge pressure of the turbocharger. This may in turn be accomplished by regulating a wastegate valve in the turbocharger unit.

The present invention provides for improved engine control as compared to known systems, allowing the engine fuel consumption to be reduced, particularly for operating conditions with high load and rotational speed. Notwithstanding this, the present invention ensures that no temperature-critical engine component will reach a temperature exceeding a critical limit value, at which damage might occur.

Preferably, the present invention is implemented as a complementing software function in a known engine control unit. Existing vehicle components are, in this way, to a high degree used in combination with auxiliary software functions, without having to introduce any additional hardware components.

BRIEF DESCRIPTION OF THE DRAWINGS

The present invention will be explained in greater detail below with reference to the following detailed description, which, in turn, refers to the enclosed drawings, in which.

DETAILED DESCRIPTION

Figure 1:
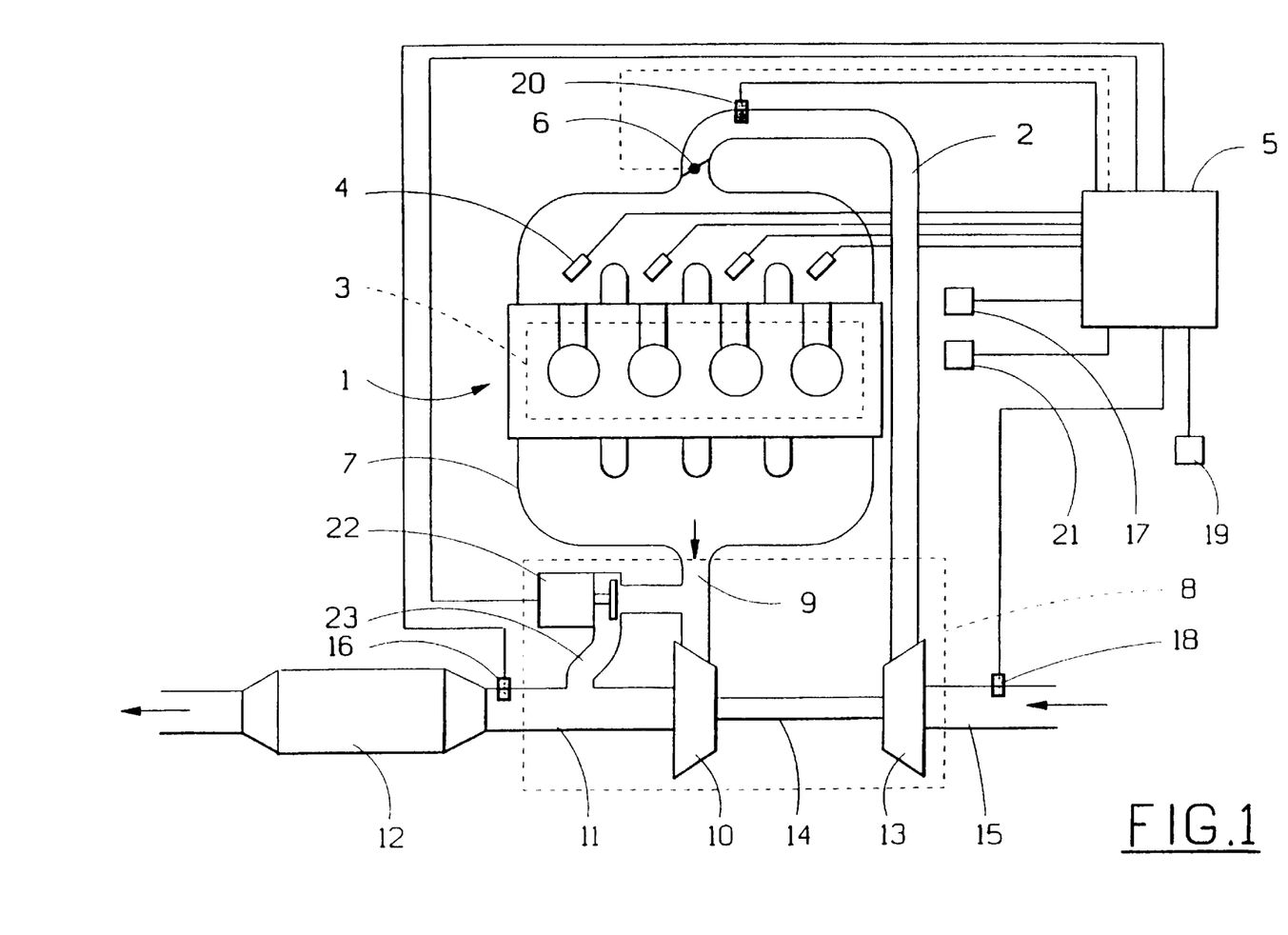
FIG. 1 is a schematic representation, in principle, of an arrangement in connection with an internal combustion engine in which the present invention may be applied.

FIG. 1 shows, in principle, apparatus in connection with an internal combustion engine to which the present invention may be applied. According to a preferred embodiment, this apparatus is provided in a vehicle, in connection with the vehicle engine 1, which preferably consists of a conventional internal combustion engine. The engine 1 is fed in the normal manner with inflowing air through an air duct 2. The engine 1 is further provided with a cylinder head 3 and an engine block having a number of cylinders and a corresponding number of fuel injection devices 4, each connected to a central control unit 5. The control unit 5, which is preferably computer based, functions in a known manner to control each injection device 4, respectively, so as to supply, at each moment, an appropriate air/fuel mixture to the engine 1.

During operation of the engine 1, the control, unit 5 functions to control the air/fuel mixture to the engine 1 in such a manner that, at each moment, the fuel mixture will be adapted to the current operating conditions. The amount of air to be supplied to the engine 1 is controlled by a throttle 6. And the supply of fuel is made a function of several parameters representing the current operating conditions of the engine 1 and the corresponding vehicle. For example, the engine control may be dependent upon the current throttle setting, the engine speed, the amount of air injected into the engine, and the oxygen concentration of the exhaust gases. The throttle 6 may be electrically controlled through a connection to the control unit 5, as indicated by a dashed line in the figure. In this case the throttle 6 is operated by an actuator motor (not shown), the position of which can be controlled by the control unit 5.

The engine 1 according to this embodiment is provided with the "multi-point" injection type, allowing the correct amount of fuel to the engine 1 to be individually supplied by means of the respective injection devices 4. The present invention may, in principle, also be utilized for so called "single-point" injection, where a single fuel injection device is located in the engine inlet manifold.

The engine 1 illustrated in the figure has four cylinders. It should however be understood that the present invention could be used for engines having different numbers of cylinders and cylinder configurations.

The exhaust gases from the engine 1 are discharged through an exhaust outlet in the form of a manifold 7. Moreover, the engine 1 illustrated is of the type equipped with a turbocharger unit 8. The present invention is, however, not limited to this type of engine, but can also be used for engines without a turbocharger unit. According to this embodiment, the exhaust gases are transported through the exhaust manifold 7 and on through an exhaust pipe 9 connected to the manifold and a turbine 10 belonging to the turbocharger unit 8. From the turbine 10, the exhaust gases are transported on through an additional exhaust pipe 11 to an exhaust gas catalytic converter 12, and then out to the atmosphere.

In a known manner, the turbocharger unit 8 comprises a compressor 13, rotatably arranged on a shaft 14, on which is also arranged the turbine. The compressor 13 functions to compress the air flowing in through an air inlet 15. In accordance with the above discussion, the incoming air is supplied to each cylinder through the air duct 2.

In a known manner, there are a number of different sensors (not shown) provided in connection with the engine 1 and the vehicle. These sensors are used for detection of different variables representing the operating conditions of the engine 1 and the vehicle.

Preferably, a lambda sensor 16 (located upstream of the catalytic converter 12) for detection of the oxygen concentration in the exhaust gases, a rotational speed sensor 17 for the engine 1, a load sensor in the form of an air flow meter 18 (for measuring the amount of air injected into the engine 1) arranged in the air inlet 15, a temperature sensor 19 for detecting the engine 1 coolant temperature, a temperature sensor 20 for the air flowing into the engine, and a sensor 21 for the vehicle speed, are used. All sensors are connected to the control unit 5 by means of electrical connections.

The turbocharger unit 8 further comprises, in a known manner, a so-called wastegate valve 22, which is electrically controllable and can be continuously controlled between two positions. The first position is a closed position, in which a bypass duct 23 in the turbocharger unit is blocked so as to conduct the exhaust gases from the manifold 7 through the turbine 10. The other position is an open position, in which the passage through the bypass duct 23 is open. In the latter case, the exhaust gases will be bypassed directly to the exhaust pipe 11, without flowing through the turbine 10, which reduces the charge pressure from the turbocharger unit 8 during operation. For control of the wastegate valve, it is connected to the control unit 5. In this way, the turbocharger pressure can be influenced by controlling the function of the wastegate valve 22.

During operation of the engine 1, the control unit 5 functions to control the air/fuel mixture to the engine 1 so as to keep it, at all times, as close to the stoichiometric mixture (i.e. $\lambda=1$) as possible. As discussed above, however, during certain operating conditions, particularly at high loads, there is a risk that the thermal load on the engine 1 and its associated components may cause damage to and a deteriorated strength in these components. As examples of particularly sensitive components are the exhaust manifold 7. the turbocharger unit 8, the cylinder head 3 and the catalytic converter 12. Consequently, there is a need for limiting the temperature of those thermally sensitive components.

As is discussed in greater detail below, a value of the temperature of at least one, from a temperature point of view critical, component is derived in the control unit 5. This temperature value is used to control the engine 1, e.g. for a calculation of the amount of surplus fuel to be supplied to the respective cylinder 3. According to a preferred embodiment, the thermal load of the engine system may thus be controlled by the supply of surplus fuel in such a way that this temperature value will never exceed a predetermined limit value, corresponding to the presence of a risk of damage to the component in question.

In accordance with a first embodiment, preferably two temperature values are derived. The first value corresponds to the temperature of the material in the cylinder head 3. The second value represents the temperature in the turbocharger unit 8. The points in question are preferably selected as points in the respective components that from experience may be expected to be sensitive to high temperatures.

Figure 2:
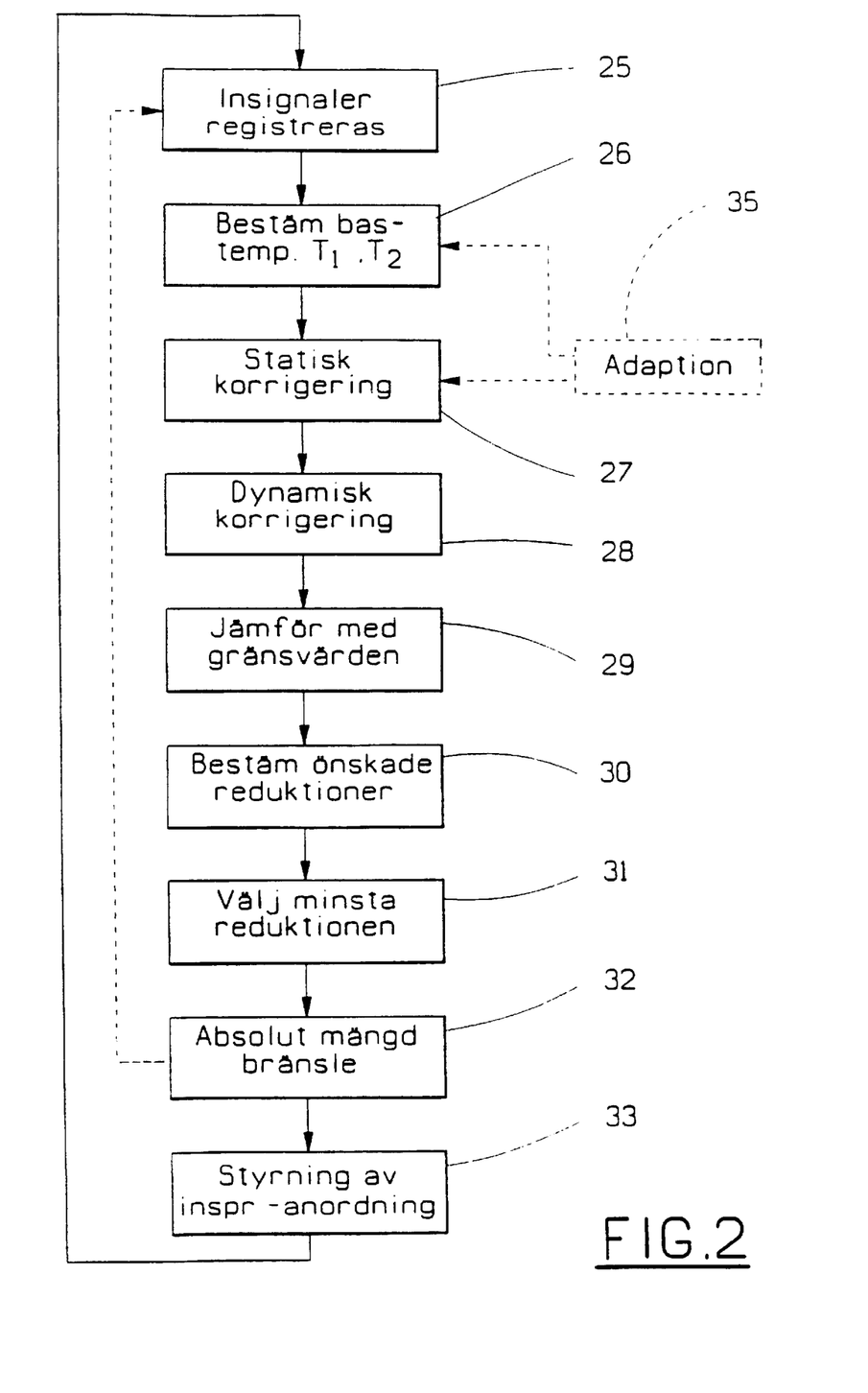
FIG. 2 is a flow chart showing the function of the control according to the present invention.

FIG. 2 is a flow chart which, in a somewhat simplified manner, shows the function of the present invention according to this first embodiment. The engine control will follow a periodical course which is initiated by data representing the vehicle operating conditions being detected by means of the sensors 16–21 (compare FIG. 1) and registered in the control unit 5 (square 25). These data preferably comprise the engine speed, the engine load (e.g. the amount of air per combustion), the ignition angle, the engine coolant temperature, the temperature of the incoming air, and the vehicle speed.

From the detected data of engine speed and load, two values, here called base temperatures $T_1$ and $T_2$ respectively, are modeled, which represent indications of the temperatures of the selected temperature-critical material points (preferably consisting of the cylinder head and the turbocharger unit, respectively) (square 26). For this purpose, a relationship between the base temperatures, $T_1$ and $T_2$, and the engine speed and load may be predetermined for the engine type in question. This is done through temperature measurements which are made in advance at a number of different speeds and loads, whereby the relationships are stored in the form of a table in the control unit 5. All other data concerning the vehicle operating conditions (i.e. the incoming air temperature, the injection time, the ignition angle, the coolant temperature and the vehicle speed) are at this stage assumed to be equal to their nominal values, i.e. values corresponding to an operating condition of the engine system during normal, continuous operation.

The next step of the procedure comprises a static correction being made of the base temperatures, $T_1$ and $T_2$ (square 27). Hereby corrections $\Delta T_1$ and $\Delta T_2$ are produced, dependent upon to what extent the recorded data for the engine injection time and ignition angle, coolant temperature, air temperature and vehicle speed are deviating from their respective normal values. For example, the two different temperatures, in the cylinder head 3 and the turbocharger unit, are influenced to a different extent by changes in the above parameters. These dependencies may also be produced by utilizing tables stored in the control unit and defining a model for the temperatures of the cylinder head 3 and the turbocharger unit. In this way, statically corrected values can be determined as follows:

$$T_{1s}=T_1+\Delta T_1$$

$$T_{2s}=T_2+\Delta T_2$$

where $T_{1s}$ is the statically corrected value of the cylinder head temperature and $T_{2s}$ is the statically corrected value of the turbocharger unit temperature.

The statically corrected temperature values, $T_{1s}$ and $T_{2s}$, are then subjected to a dynamic correction (square 28). This is preferably made by means of a low-pass filtration of these temperature values, producing dynamically corrected, modeled values, $T_{1M}$ and $T_{2M}$, respectively.

According to this embodiment, a low-pass filtration of the first order is used for the dynamic correction. Dynamic corrections of the statically corrected temperature values, $T_{1s}$ and $T_{2s}$, are now obtained according to the relationships:

$$T_{1M}[t]=(1-h_1/T_1)T_{1M}[t-1]+(h_1/t_1)T_{1s}[t]$$

$$T_{2M}[t]=(1-h_2/t_2)T_{2M}[t-1]+(h_2/t_2)T_{2s}[t]$$

where $T_{1M}$ is the output signal from the filter, corresponding to the final temperature estimation for the cylinder head 3, $T_{2M}$ is the output signal from the filter, corresponding to the final temperature estimation for the turbocharger unit, $t_1$ and $h_1$ are the time constant and the sampling interval, respectively, for the cylinder head 3, and $t_2$ and $h_2$ are the time constant and the sampling interval, respectively, for the turbocharger unit. Preferably, the time constants are selected as suitable functions of the engine speed and load. Through this dynamic modeling according to the present invention, the thermal inertia associated with the heating of the engine system can be utilized. In this context, the term "thermal inertia" is used to describe the inherent dynamic temperature filtration, i. e. the relatively slow adaptation to a changed temperature existing between the exhaust gases and the material in the engine and the exhaust system. This thermal inertia is in turn due to the heat transfer between gas and wall material, the thermal capacity of the material, and the cooling effect of the surrounding media (e.g. air, water and material).

The modeled temperature values, $T_{1M}$ and $T_{2M}$, thus represent the estimated temperatures of the cylinder head and the turbocharger unit, respectively, which have been compensated for by the above-mentioned thermal inertia, and which will subsequently be used for controlling the surplus fuel supplied to the engine at full load. A comparison is thus made between the modeled temperature values, $T_{1M}$ and $T_{2M}$, and the predetermined limit temperatures, $T_{1G}$ and $T_{2G}$, representing critical temperatures at which the cylinder head 3 and the turbocharger unit, respectively, run the risk of being damaged (square 29), as is discussed above. The critical temperatures vary with the component in question, and also with the material used in that component.

From the above comparisons, corresponding values for a reduction of the amount of fuel injected into the engine are then determined (corresponding to the extent to which the injection time will be reduced in relation to the nominal case), which are to be used in controlling the engine injection device (square 30). This means that two different values for the reduction of the amount of injected fuel will be obtained, i.e. one value representing the calculation ($T_{1G}-T_{1M}$) for the cylinder head 3 and one value representing the calculation ($T_{2G}T_{2M}$) for the turbocharger unit. In order to ensure that the critical temperature of the cylinder head 3, as well as that of the turbocharger unit, is never exceeded, the smaller of the two reductions is selected for the continued engine control (square 31). In this manner, a value of a corrected absolute amount of injected fuel is obtained (square 32), which is used in engine control for regulation of the respective injection device (square 33). This will, in turn, create a limitation of the temperature within the system, as was explained above.

The corrected absolute amount of injected fuel will deviate to a certain degree from the nominal absolute amount. The respective injection device is therefore controlled according to this corrected amount The process then returns to square 25. When the process then restarts again, input signals from the various sensors will again be detected. In this manner, the previously calculated value for the amount of injected fuel will be used as one variable in this detection (square 25). A dashed line in FIG. 2 indicates this.

Through the control according to the present invention, a reduction of the nominal amount of injected fuel is obtained, which in turn creates a fuel saving, but without exceeding the critical temperatures for the cylinder head 3 or the turbocharger unit. Furthermore, the corrected amount of fuel is preferably limited downwards by means of a maximum allowed λ value (preferably λ=1).

According to an alternative embodiment, the control of the added fuel amount in the "critical area" may be performed for the individual cylinder. For this purpose, the engine must then comprise separate injection devices and ignition angle control for each cylinder. This is frequently available in today's vehicles.

The function of the present invention will now be explained further with reference to FIG. 3, which shows a diagram of the amount of surplus fuel supplied as a function of time. The diagram shows an operating sequence that, at a certain point in time, $t_1$, includes a situation with a large increase in load, i.e. into that "critical area" which is characterized by such high loads and rotational speeds that the air/fuel mixture would normally be made richer than the stoichiometric mixture.

Figure 3:
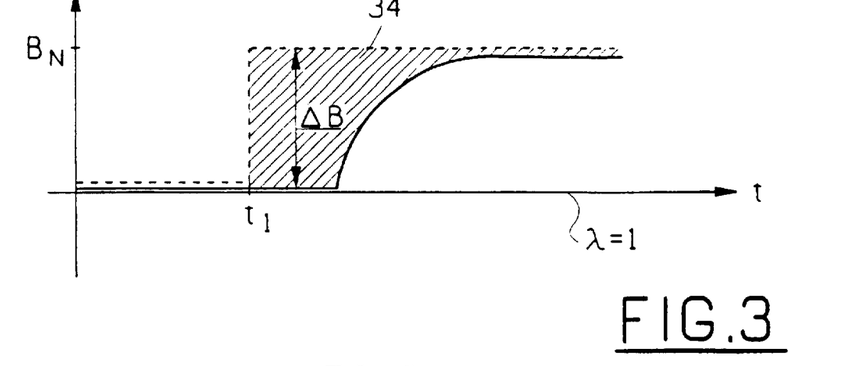
FIG. 3 is a graphical representation which illustrates the function of the present invention and its effect on the fuel consumption of an internal combustion engine.

The amount of fuel supplied according to the present invention (i.e. the corrected absolute fuel amount) is shown in FIG. 3 by a continuous line, whereas the amount of fuel according to the known art (i.e. the nominal absolute fuel amount) is shown by a dashed line. The level corresponding to zero of the y axis represents that case where the air/fuel mixture is stoichiometric, i.e. where λ=1.

In the above situation, according to the known art, a sudden step occurs in the amount of fuel supplied, up to a level $B_N$, causing a reduction of the exhaust gas temperature, as explained above. This fuel amount $B_N$ corresponds to the exhaust gas temperature being limited to a critical limit value. Contrary to the known art, the present invention is based on the understanding that such a large step $B_N$ in fuel supply is not necessary at once for the above load increase at $t_1$, as the material temperatures (e.g. in the cylinder head 3 and the turbocharger unit) will not increase as rapidly as the load change does. Consequently, according to the present invention, for each time increment a certain reduction of the surplus fuel amount that would normally be supplied to the engine takes place. This reduction corresponds to a deviation ΔB from the nominal amount of fuel $B_N$. In accordance with what is shown in FIG. 3, this deviation ΔB will successively be reduced to zero. In spite of a relatively small amount of surplus fuel being supplied during this process, the amount will still be large enough to prevent the material temperatures from exceeding their critical values. In view of the control according to the present invention, a lower fuel consumption than in the nominal case is achieved. The shaded area 34 of FIG. 3 will thus correspond to the fuel saving compared to the previously known art.

Practical tests have shown that the present invention achieves a substantial reduction of the fuel consumption at high loads and engine speeds. The present invention works particularly well during highway driving with frequent overtaking with generally fully open throttle.

Instead of comparing to fixed, nominal values (compare square 27, FIG. 2), the modeling process according to the present invention can be made adaptive. This may be necessary because one of the sensors 16–21 (see FIG. 1) is providing measurement values that drift over time and will provide differing measurement results, or because different engines will differ even if they are of the same model, making individual adaptation necessary. Furthermore, aging of the engine and its associated components may require adaptive control. A detection of changes can be made by means of separate sensors or through empirical relations stored in tables in the control unit. Such possible changes may for example be detected by a temperature sensor (not shown) for measuring the exhaust gas temperature. As the measured temperature changes, the static calculation model will then be updated by being corrected. This adaptive calculation model (square 35) may then be included into the flow chart according to FIG. 2 by correcting on one hand the modeling of the base temperatures (square 26) and on the other the calculation model used for the static correction (square 27).

Consequently, the values obtained for the injected amount of fuel (see square 32, FIG. 2) can be utilized for controlling the engine 1 at high loads and speeds. As discussed above, this control may be performed by regulating the amount of surplus fuel to the engine. Alternatively, the control may also be performed by a regulation of the total amount of fuel and air supplied to the engine, in which case a lower engine power output entails a temperature decrease. This may in turn be controlled by means of the throttle 6, if the latter is an electrically controlled throttle.

Figure 4:
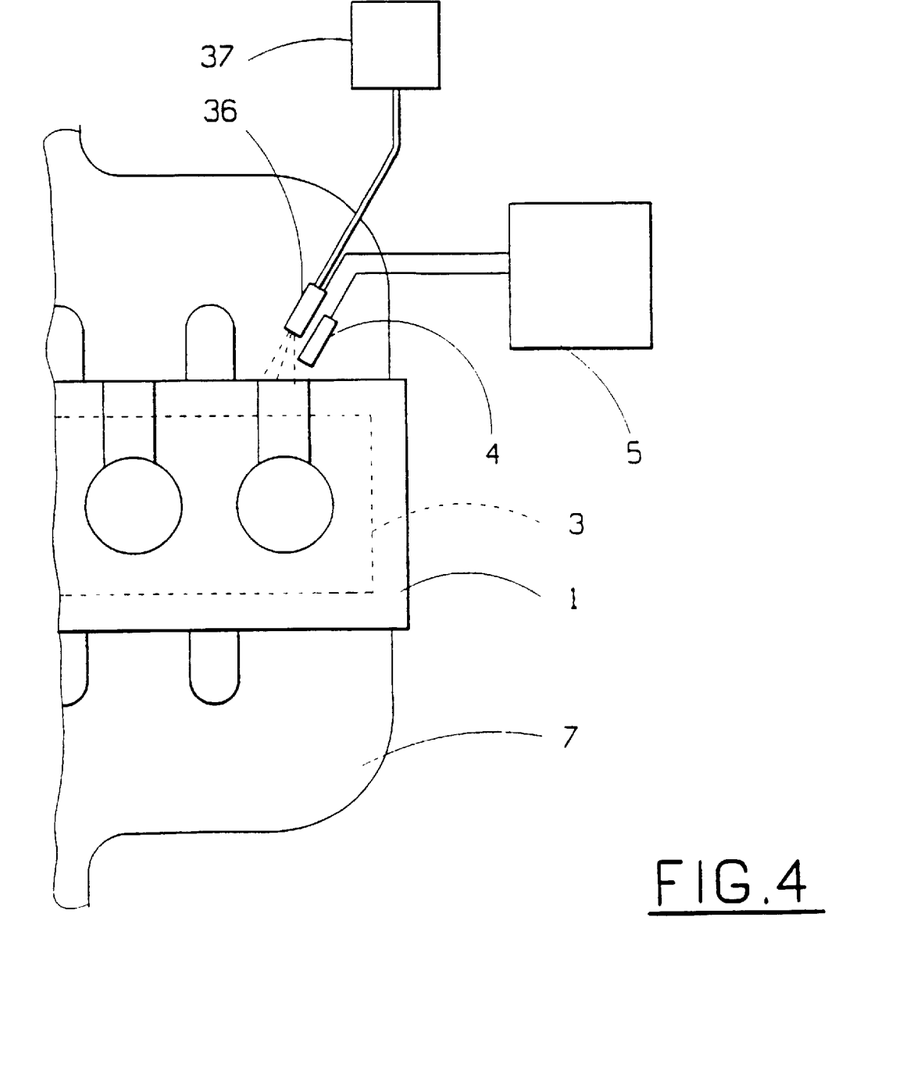
FIG. 4 is a partial, schematic representation of apparatus in connection with an internal combustion engine, according to a second embodiment of the present invention.

According to a further embodiment of the present invention, cooling the respective engine combustion chambers by means of a suitable coolant, for example water, may also constitute control of the engine thermal load. FIG. 4 shows, in principle, how the present invention can be adapted for such an embodiment. The arrangement according to FIG. 4 corresponds to that shown in FIG. 1. with the exception of a particular injector 36 for water, located at the respective cylinder 3 of the engine 1. The injector 36 is furthermore connected to a water pump 37 that is functioning to deliver water under high pressure during operating conditions characterized by high loads and speeds.

Figure 5:
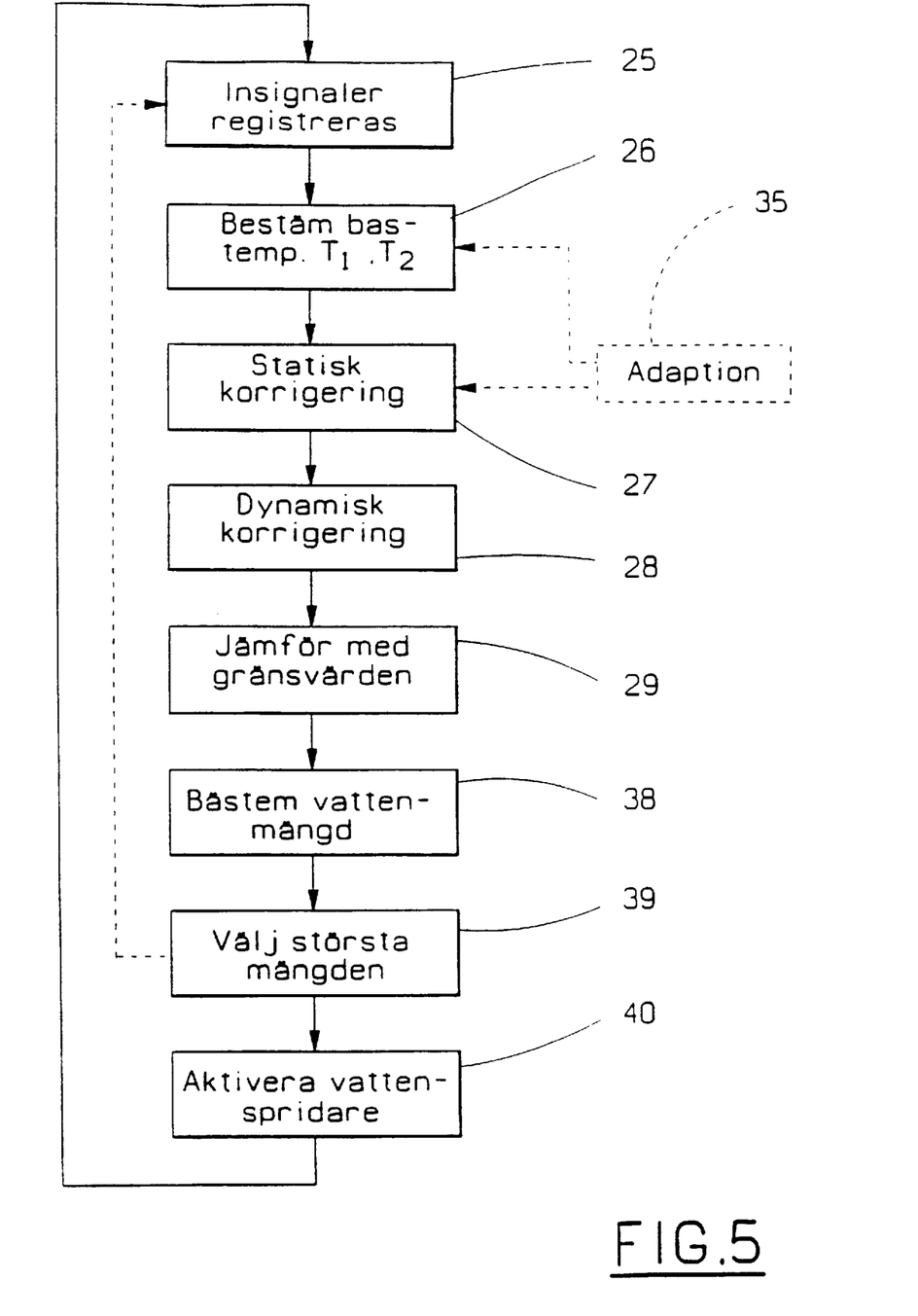
FIG. 5 is a flow chart showing the function of the control according to the second embodiment of the present invention shown in FIG. 4.

FIG. 5 shows the operation of the second embodiment of the present invention. The reference numerals 24–29 correspond to that used in connection with FIG. 2. When the comparison is made between the modeled temperature values, $T_{1M}$ and $T_{2M}$, and the respective limit values, $T_{1G}$ and $T_{2G}$, it is determined to what extent water injection by each injector 36 is deemed necessary in order to limit the material temperatures in the cylinder head and the turbocharger unit, respectively. These values are based on a modeling, performed in advance, of the effect of the amount of water on the respective temperatures, as a function of the operating point. In order to ensure that the critical temperature of the cylinder head 3, as well as that of the turbocharger unit, is never exceeded, the larger of the two water amounts is selected for the continued control (square 39).

Thereupon, the respective injector 36 is activated for the cylinder or cylinders where cooling is required (40). Then, when the process restarts, a feedback is obtained in that the selected value of water amount supplied is used as an input signal for the temperature model (square 25).

Figure 6:
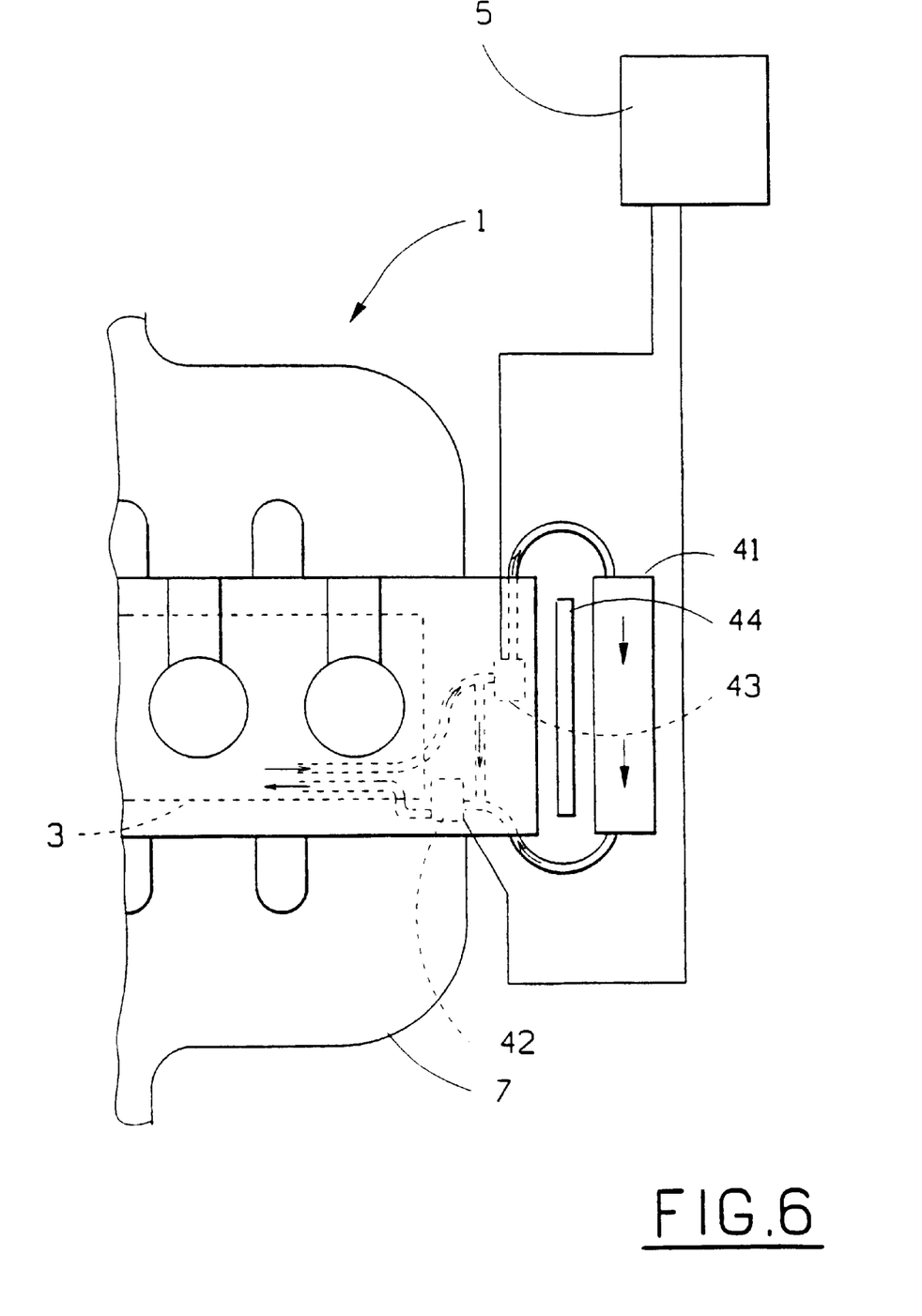
FIG. 6 is a partial, schematic representation, in principle, of an apparatus in connection with an internal combustion engine, according to a third embodiment of the present invention.

According to a third embodiment, the cooling of the engine is controlled by means of controlling the engine coolant temperature. FIG. 6 shows an arrangement by which such a control may be utilized. The arrangement according to FIG. 1 corresponds to that shown in FIG. 1, with the exception of using the coolant system of the engine 1 for controlling the motor as a function of load and speed variations. The engine 1 is in a known manner provided with a radiator 41 for a water-based coolant, which is made to circulate inside the engine by means of a coolant pump 42. In the figure, arrows indicate the coolant flow direction. A thermostat 43 governs the coolant flow. The thermostat 43 (and preferably also the pump 42) is electrically controlled and connected to the control unit 5. The system, in a known manner, further comprises a cooling fan 44.

The coolant circulating in the engine 1 absorbs heat. By means of the thermostat 43, the coolant flow inside the engine I can be controlled. When the engine 1 is cold, no coolant circulates through the radiator 41, as the thermostat 43 is set to a certain limit temperature and will block coolant flow to the radiator 41 when the engine temperature is lower than the limit temperature. In accordance with FIG. 6, the coolant will, however, circulate inside the engine 1 also when the thermostat 43 is blocking the flow to the radiator 41. When the engine has been warmed up to the limit temperature of the thermostat 43. the latter will open and allow coolant flow to the radiator. In this way the engine can be cooled, so that the temperature-critical components are not damaged.

Figure 7:
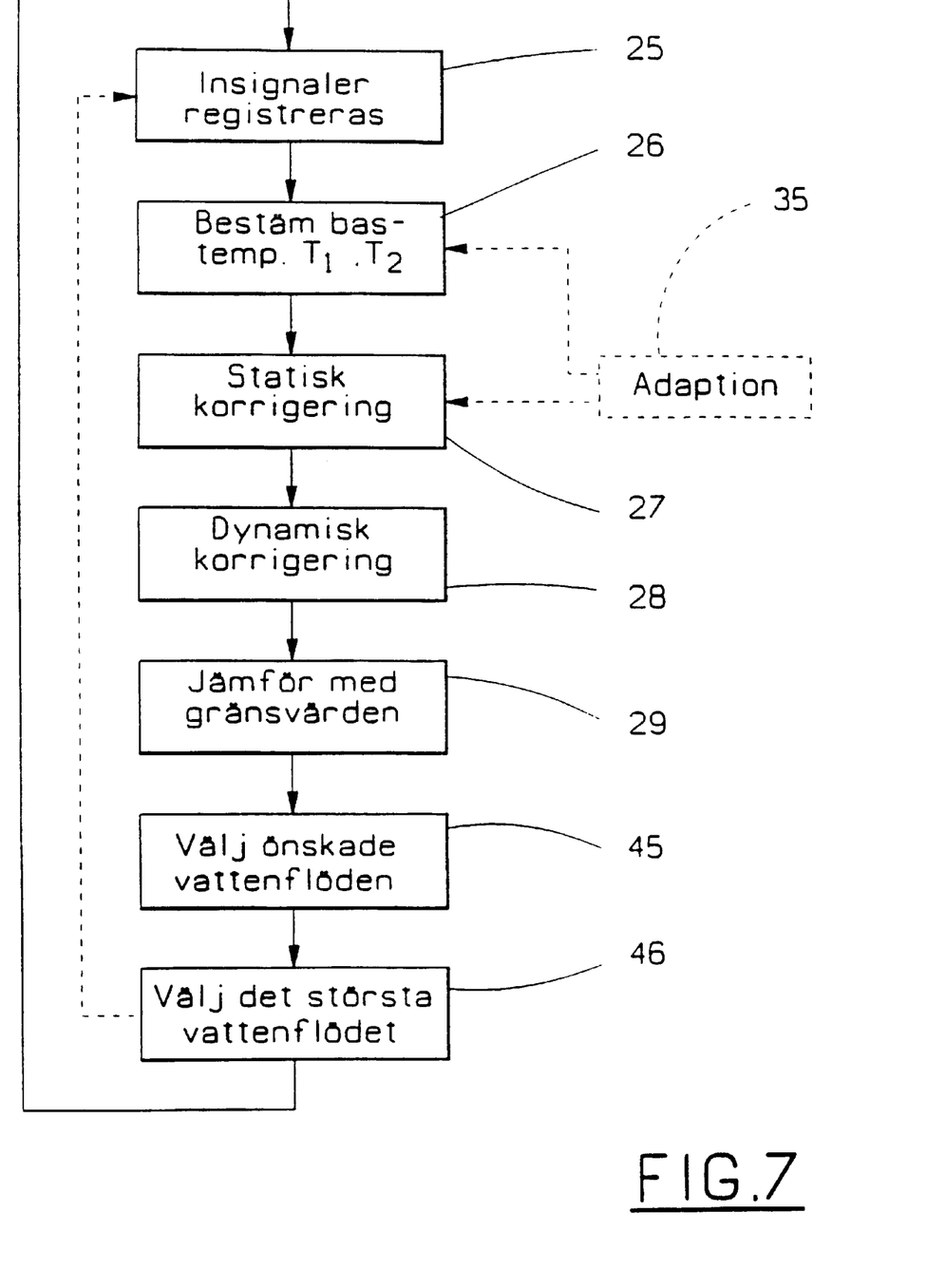
FIG. 7 is a flow chart showing the function of the control according to the third embodiment of the present invention shown in FIG. 6.

In accordance with the present invention, the limit temperature of the thermostat 43 can be adjusted according to the cooling needs, e.g. if a sudden increase occurs in load and speed. This is then performed as is shown in FIG. 7. The reference numerals 24–29 correspond to those in FIGS. 2 and 5. When the comparison is made between the modeled temperature values, $T_{1M}$ and $T_{2M}$, and the respective limit values, $T_{1G}$ and $T_{2G}$, it is determined what coolant flow through the radiator 41 is necessary for the required degree of cooling (square 45). In order to ensure that the critical temperature of the cylinder head as well as that of the turbocharger unit is never exceeded, the larger of the two calculated water flow rates is selected for continued control (square 46). Consequently, cooling of the engine will be performed depending upon the selected limit value of the thermostat. This value will also be used in the continued detection of variables regarding the engine operating conditions (square 25).

According to a fourth embodiment, engine cooling can be achieved by regulation of the above-mentioned wastegate valve 22 (see FIG. 1), which for this purpose will be electrically controlled by means of the control unit 5. Unlike the methods described above, the wastegate valve 22 can, according to this fourth embodiment, be regulated, more specifically by changing it to a variable mode, in order to lower the charge pressure from the turbocharger unit. Thus, the temperature in the turbocharger unit 8 will be reduced. By utilizing previously known relationships between the charge pressure of the turbocharger unit 8 and the modeled values of the temperatures, $T_{1M}$ and $T_{2M}$, of the cylinder head and the turbocharger unit, respectively, the wastegate valve may be controlled so as to obtain the required charge pressure.

The present invention is not limited by the embodiments described above and shown in the drawings, but may be varied within the scope of the appended claims. For example, a multitude of different material points may be used, i.e. not only the cylinder head 3 and the turbocharger unit as stated above. These material points are selected in those components associated with the engine that are judged to be temperature-critical. Examples of other material points that may be utilized are the catalytic converter and the lambda probe.

When selecting material points, preferably one point associated with the engine combustion chamber and one point downstream of the engine are selected.

Aside from the above embodiments, where various types of engine cooling are used, other forms of cooling can be utilized. As an example, the vehicle cooling fan may be controlled for this purpose.

The embodiment described in connection with FIGS. 6 and 7 could be arranged so that the control according to the present invention is activated when the coolant has reached a certain predetermined limit temperature.

The temperatures of one or more of the thermally critical components could alternatively be determined with the aid of a hardware type temperature sensor that may be fitted to the component in question. Consequently, directly measured values could also be used, instead of modeled values, in the control used according to the present invention for cooling the engine.

Other variables concerning the vehicle and the engine operating conditions than the ones stated above, may be utilized and considered in determining the current temperature values. For example, the λ value obtained in the exhaust gases, during full load modeling according to the present invention, could be fed back and used as an input variable to the control unit Furthermore, existing systems for detection of erroneous ignition (so called "misfire") of the engine could be utilized for the modeling, as an incomplete ignition will also influence the exhaust gas temperature.

The present invention can also be used for engines without turbocharger units. Preferably, the exhaust manifold would then be used as a temperature-critical component, the temperature of which you would wish to model.

Cooling by means of thermostatic control according to FIGS. 6 and 7 is preferably used as a complement to one of the other types of cooling described above, as its influence is slower, and may primarily be used for control of the temperature in the cylinder head 3.

Finally, it should be understood that the cooling of the engine might be realized through various combinations of the embodiments described above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for controlling an internal combustion engine in a vehicle comprising detecting a value of at least one predetermined variable associated with an operating condition of said internal combustion engine selected from a group consisting of a rotational speed and a load of said internal combustion engine, determining a temperature value of at least one temperature-critical component associated with said internal combustion engine in said vehicle, said temperature-critical component having an inherent thermal inertia, and controlling the load of said internal combustion engine based upon said determined temperature value by adding surplus fuel to said internal combustion engine, said adding of said surplus fuel to said internal combustion engine comprising gradually increasing a supply of said surplus fuel based upon said value of said at least one predetermined variable derived from said inherent thermal inertia.

2. The method of claim 1 including providing a predetermined limit value for said at least one temperature-critical component, and wherein said controlling of said thermal load of said internal combustion engine comprises cooling said internal combustion engine, said cooling of said internal combustion engine comprising minimizing said cooling over time without said determined temperature value exceeding said predetermined limit temperature value for said at least one temperature-critical component.

3. The method of claim 2 wherein said controlling of said thermal load of said internal combustion engine comprises cooling at least one cylinder of said internal combustion engine by supplying an amount of a coolant to said at least one cylinder based on at least said determined temperature value.

4. The method of claim 2 wherein said internal combustion engine includes a thermostat for controlling the supply of coolant to said internal combustion engine, and wherein said controlling of said thermal load of said internal combustion engine comprises controlling said thermostat.

5. The method of claim 2 wherein said internal combustion engine includes a turbocharger having a wastegate valve, and wherein said controlling of said thermal load of said internal combustion engine comprises controlling said wastegate valve whereby a charge pressure for said turbocharger is generated based upon said determined temperature value.

6. The method of claim 1 including providing a predetermined limit value for said at least one temperature-critical component, and wherein said gradually increasing of said supply of said surplus fuel comprises controlling said supply of said surplus fuel whereby a substantially stoichiometric air/fuel mixture of said surplus fuel is supplied to said internal combustion engine, and including gradually enriching said air/fuel mixture based upon the difference between said determined temperature value and said predetermined limit temperature value.

7. The method of claim 1 wherein said determining of said temperature value comprises providing a dynamic model of said detected value of said at least one predetermined variable associated with said operating condition of said internal combustion engine based on said inherent thermal inertia.

8. The method of claim 1 wherein said at least one predetermined variable includes the injection time, the ignition angle, the cooling temperature, the temperature of air flowing into said internal combustion engine, the rotational speed, the air flow rate and the speed of said vehicle.

9. The method of claim 1 wherein said determining of said temperature value of said at least one temperature-critical component comprises determining at least two temperature values of at least two temperature-critical components, and including controlling said thermal load of said internal combustion engine based upon said determined temperature value representing the largest reduction of said thermal load.

10. The method of claim 9 wherein said internal combustion engine includes at least one cylinder head and a turbocharger, and wherein said at least two temperature-critical components comprise said at least one cylinder head and said turbocharger.

11. The method of claim 1 including adapting said value of said at least one predetermined variable associated with said operating conditions of said internal combustion engine based upon changes in said detected values.

12. Apparatus for controlling an internal combustion engine in a vehicle comprising at least one sensor for detecting a value of at least one predetermined variable associated with an operating condition of said internal combustion engine selected from a group consisting of the rotational speed and a load of said internal combustion engine, and a control unit for controlling an air/fuel mixture supplied to said internal combustion engine, determining a temperature value of at least one temperature-critical component associated with said internal combustion engine in said vehicle, said temperature-critical component having an inherent thermal inertia, and controlling the load of said internal combustion engine based upon said determined temperature value by adding surplus fuel to said internal combustion engine and gradually increasing said supply of said surplus fuel based upon said value of said at least one predetermined variable derived from said inherent thermal inertia.

* * * * *

UNITED STATES PATENT AND TRADEMARK OFFICE
CERTIFICATE OF CORRECTION

PATENT NO.    : 6,397,820 B1
DATED         : June 4, 2002
INVENTOR(S)   : Novak et al.

It is certified that error appears in the above-identified patent and that said Letters Patent is hereby corrected as shown below:

Column 4,
Line 24, "an-optimum" should read -- an optimum --
Line 27, "exceeded, This" should read -- exceeded.  This --

Column 5,
Line 63, "control, unit" should read -- control unit --

Column 9,
Line 21, "amount The" should read -- amount.  The --

Column 10,
Line 4, "$\Delta$B" should read -- AB --

Column 12,
Line 43, "unit Furthermore" should read -- unit. Furthermore --

Signed and Sealed this

Nineteenth Day of November, 2002

Attest:

JAMES E. ROGAN
Attesting Officer    Director of the United States Patent and Trademark Office